Sept. 27, 1960 SHOJI ANZAI 2,953,982
PHOTOGRAPHIC EXPOSURE TIME LIMIT ADJUSTING
MEANS FOR FOCAL PLANE SHUTTER
Filed June 3, 1957 2 Sheets-Sheet 1

INVENTOR.
Shoji Anzai
BY

Sept. 27, 1960 SHOJI ANZAI 2,953,982
PHOTOGRAPHIC EXPOSURE TIME LIMIT ADJUSTING
MEANS FOR FOCAL PLANE SHUTTER
Filed June 3, 1957 2 Sheets-Sheet 2

INVENTOR.
Shoji Anzai
BY
*[signature]*
his Attorney

United States Patent Office 2,953,982
Patented Sept. 27, 1960

2,953,982

PHOTOGRAPHIC EXPOSURE TIME LIMIT ADJUSTING MEANS FOR FOCAL PLANE SHUTTER

Shoji Anzai, 638 Shimizu-cho, Shimura, Itabashi-ku, Tokyo, Japan

Filed June 3, 1957, Ser. No. 663,042

Claims priority, application Japan June 2, 1956

8 Claims. (Cl. 95—57)

This invention relates to photographic time limit adjusting means for focal plane shutters.

Such means of the kind above referred to has been proposed in various forms and is commonly used. However, they are of the intermittent type, as commonly known to those skilled in the art.

The main object of this invention is to provide a photographic exposure time limit adjusting means for focal plane shutters, capable of adjusting the shutter speed in a stepless or continuous manner to provide fine adjustments.

A further object of this invention is to provide means of the kind above mentioned, capable of being manipulated at any desired time, regardless of the shutter setting.

Still another object of the invention is to provide a shutter speed regulating means having a simpler, more reliable and rigid construction.

The novel adjusting means according to this invention comprises for the purpose, a planetary gearing arranged in the shutter releasing mechanism; and a manually adjustable means operatively connected to said gearing; said latter means being so arranged that by rotating the former to a desired degree in one or the opposite direction the shutter speed is varied in a stepless manner.

Various further and more specific objects, features and advantages of the invention will appear from the description given below, taken in connection with accompanying drawings illustrating by way of example a preferred embodiment of this invention.

Figure 1:
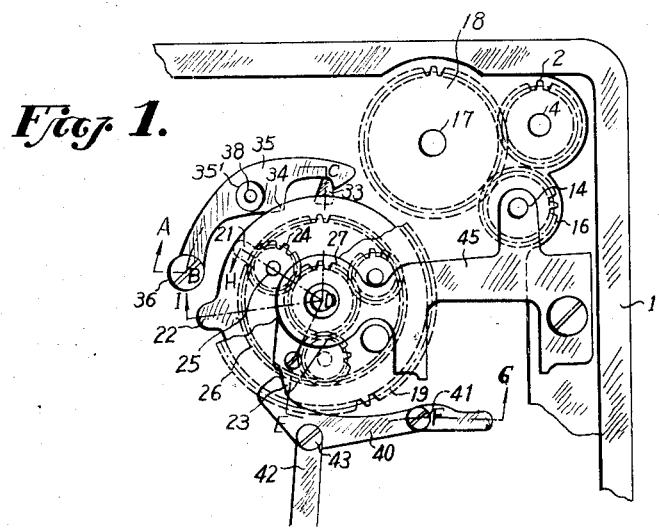
Fig. 1 shows an elevation of essential parts of the novel adjusting means.

Now referring to the drawings, 1 denotes the camera casing in part, in which a shutter winding drum shaft 4 is rotatably supported. Although not shown, the drum shaft 4 is provided at each end with a proper bearing for the purpose. Nearly at both ends of the said drum shaft 4 are rigidly attached small drums $3^1$, on which ribbons 3 are wound. The opposite ends of the ribbons 3 are fixed to both ends of a metal strip $9^1$, respectively, which is attached to the end of the first or leading membrane or curtain 9 of the focal plane shutter. Upon said drum shaft 4, a shutter winding drum 5 is rotatably mounted, said drum 5 being provided with a toothed wheel 7 rigidly fixed thereto. The second or following membrane or curtain 6 of the shutter is wound around the drum 5. A gear 2 is fixed on one end of said shaft 4.

Figure 2:
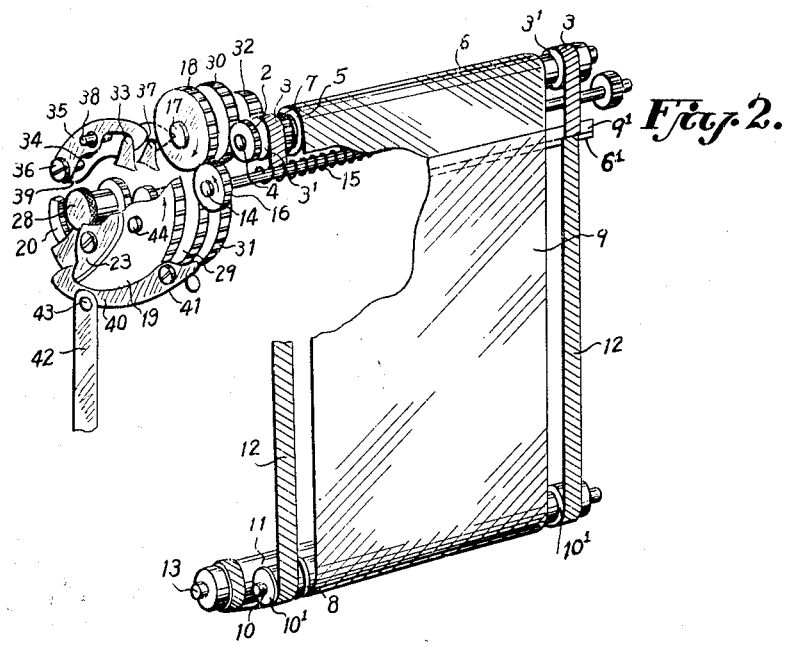
Fig. 2 represents a perspective view thereof.

In a similar way, a shutter rewinding drum shaft 10 is rotatably mounted in the camera casing 1 and provided with small guiding rollers $10^1$ fixed at both ends thereof. A shutter rewinding drum 8 for the leading membrane 9 is rotatably mounted on the shaft 10. In a parallel and spaced relation to the latter, a further rewinding shaft 13 is again rotatably supported through suitable bearings (not shown) in the casing 1, a rewinding drum 11 being loosely mounted on the shaft 13. A metal strip $6^1$ is arranged behind said strip $9^1$ in the position shown in Fig. 2 and fixed with the free end of the second or following membrane 6. Ribbons 12 attached to said strip $6^1$ extend downwards in Fig. 2, are guided around said rollers $10^1$ and wound on said rewinding drum 11. Although not shown, a coil spring is arranged within each of said rewinding drums 8 and 11 and serve to urge the shutter to be rewound. Aforementioned arrangements and constructions of the parts are, of course, familiar to those skilled in the art.

In a spaced and parallel relation to the first mentioned drum shaft 4, still another shaft 14 is rotatably mounted in the casing 1, said shaft being provided with a coil spring 15 urging it to rotate in the clockwise direction, when viewed from left to right in Fig. 2. A gear 16 is fixed on the left end of the shaft 14 (Fig. 2) and meshes with an intermediate gear 18, which is mounted on a short shaft 17 supported in casing 1. 19 represents a driving gear, at the underside of which is fixed a cam 22 adapted to trip the following membrane 6, thus releasing the latter.

Figure 3:
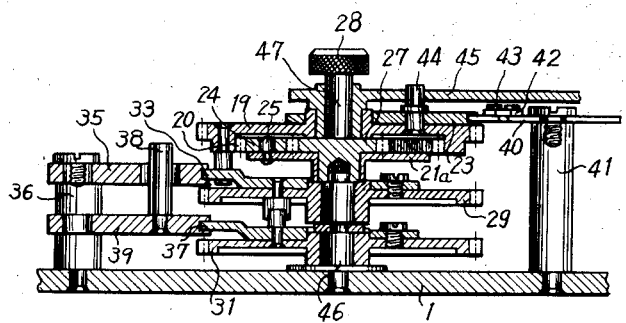
Figs. 3 and 4 are sectional representations taken on the line A—G and H—I in Fig. 1, respectively.
Figure 4:
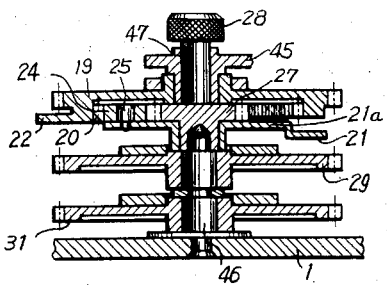
Figure 5:
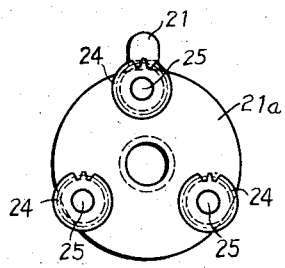
Fig. 5 is a detail view.

There is a planetary gearing 20, which comprises an internal gear 26, one or more planetary pinions 24 and a toothed wheel 27. As shown in Fig. 5, a cam 21 is provided as an integral part of a cam plate 21a and the pinions 24 are rotatably mounted on the plate 21a by pins 25. The plate 21a is rotatably mounted about the axis of the toothed wheel 27 as shown in Figs. 3 and 4. On the upper surface of said driving gear 19, a stopper 23 is rigidly fixed.

The internal gear 26 is fixed to, or made integral with the first or driving gear 19, which carries said second cam 22. The toothed wheel 27 meshes with said planetary pinions 24, said wheel 27 being rigidly fixed to the shutter speed regulating knob 28 through a short shaft 47. Gears 29 and 31 are loosely mounted on a common shaft 46 as shown in Fig. 4 and cooperate one after another by means of pin-to-pin engagement known per se. The middle gear 29 serves to wind up the leading membrane 9, said gear 29 meshing through an intermediate gear 30 with said first mentioned gear 2. The third gear 31 meshes through an intermediate gear 32 with said gear 7 fixed to the shutter drum 5. Aforementioned three intermediate gears 18, 30 and 32 are loosely mounted on short shaft 17 in a spaced relation.

A first dog 33 is fixed on said second gear 29 and engages with a pawl 35, when the shutter has been fully wound up ready for photographing. The pawl 35 is rockably supported on a stud 36, which is screwed in said casing 1. A second pawl 39 having a substantially similar shape to that of said first pawl 35 is equally rockably mounted on said stud 36 in a properly separated and parallel relation to said pawl 35, said second pawl 39 being provided with a pin 38 extending through a hole $35^1$ cut through the first pawl 35. The first pawl 35 is provided with a projection 34 serving to operate said first dog 33. A second dog 37 is similarly fixed on said third gear 31, the former being operated by said pin 38. A third pawl 40 is rockably mounted on a stud 41, which is screwed in the casing 1. The pawl 40 is adapted to mesh with the stoppper 23 fixed on the driving gear 19.

A lever 42 is operatively connected at one end with the shutter button (known per se and not shown), while said lever is linked to said third pawl 40 by means of a pin 43. When the shutter button is pushed down, the lever 42 is moved downwardly in Fig. 2. A pin 44 is fixed on the driving gear 19, so that when it strikes against a stopper 45 fixed on casing 1, the rotation of the driving gear 19 is prevented.

The operation of the apparatus is as follows:

In order to set the shutter, the shaft 14 is rotated in the counterclockwise direction, when viewed in Fig. 1. The rotation is transmitted through gears 16, 18 to the driving gear 19, which is thus caused to turn in the counterclockwise direction. The movement of the latter gear is transmitted in turn to second and third gears 29, 31 through pin-to-pin engagement. The gears 29, 31 drive through intermediate gears 30, 32 the gears 2 and 7, respectively. By these movements, the leading and following membranes 9 and 6 are wound up, respectively. When the shutter is thus fully wound, the pawl 40 engages with the stopper 23, and at the same time, the dogs 33, 37 mesh with the pawls 35 and 39, respectively. The shutter has been thus set.

Before, after or in the course of said shutter setting, the operating knob 28 is turned, for instance, in the clockwise direction, when viewed from left to right in Fig. 2, the gear 27 being turned in the same direction. As, in this case, the internal gear 26 is stationary, the planetary pinions 24 are as a whole turned in the same direction around the gear 27, resulting in the cam 21 moved correspondingly in the same direction. The longer the distance between cams 21 and 22, the slower the shutter operates. By the abovementioned manipulation of the knob 28, the shutter is naturally retarded correspondingly. By adjusting the knob 28 in the reverse direction, the shutter will operate at a faster speed.

When the shutter button is depressed, the lever 42 correspondingly lowers, so that the pawl 40 is disengaged from the stopper 23, the driving gear 19 turning in the clockwise direction, until the cam 21 strikes against the projection 34. The pawl 35 is disengaged from the dog 33, thus releasing the leading membrane 9 of the shutter. Shortly thereafter, the cam 22 strikes against the pin 38 fixed to the pawl 39, causing the latter being disengaged from the dog 37. Thus, the following membrane 6 is released.

Although a particular embodiment of the invention is herein disclosed for the purpose of explanation, further modifications thereof, after study of this specification, will be apparent to those skilled in the art to which the invention pertains. Reference should accordingly be had to the appended claims in determining the scope of the invention.

Having thus described the invention, what is claimed as new and desired to be secured by Letters Patent is:

1. Photographic exposure time limit adjusting means for a focal plane shutter comprising: a rotatable member; two cams fixed for rotation with said member and angularly adjustable with respect to each other; winding drums for winding the leading and following membranes of the shutter; rewinding drums for rewinding the membranes upon release of the winding drums; and pawls adapted to retain the respective winding drums in a wound up position, the pawl adapted to retain one of said winding drums being releasable by one of said cams and the pawl adapted to retain the other of said winding drums being releasable by the other of said cams, said rotatable member being provided with a planetary gear mechanism, driving means operatively connected to said planetary gear mechanism, said rotatable member being operatively connected to said pawls via said cams for releasing said curtains, said planetary gear mechanism having a central gear shaft which is operatively connected to a knob which is angularly adjustable for speed adjustment of said curtains.

2. Photographic exposure time limit adjusting means for a focal plane shutter comprising: a rotatable member; two cams fixed for rotation with said member angularly adjustable with respect to each other; winding drums for winding the leading and following membranes of the shutter; rewinding drums for rewinding the membranes upon release of the winding drums; and pawls adapted to retain the respective winding drums in a wound up position, the pawl adapted to retain one of said winding drums being releasable by one of said cams by rotation of said rotatable member and the pawl adapted to retain the other of said winding drums being releasable by the other of said cams upon further rotation of said member, said rotatable member being provided with a planetary gear mechanism, driving means operatively connected to said planetary gear mechanism, said rotatable member being operatively connected to said pawls via said cams for releasing said curtains, said planetary gear mechanism having a central gear shaft which is operatively connected to a knob which is angularly adjustable for speed adjustment of said curtains.

3. Photographic exposure time limit adjusting means for a focal plane shutter comprising: a planetary gearing comprising a planetary pinion and an internal gear; a first cam rotatable about the axis of said gearing with said planetary pinion; a second cam rigidly fixed with respect to said internal gear; winding drums for winding the leading and following membranes of the shutter respectively; rewinding drums for rewinding the membranes upon release of the winding drums; gearings operatively connected to said winding drums respectively; and pawls adapted to engage said gearings to retain the respective winding drums in a wound up position, the pawl adapted to retain one of said winding drums being releasable by one of said cams and the pawl adapted to retain the other of said winding drums being releasable by the other of said cams.

4. Photographic exposure time limit adjusting means for a focal plane shutter comprising: a planetary gearing comprising a planetary pinion and an internal gear; a first cam rotatable about the axis of said gearing with said planetary pinion; a second cam rigidly fixed with respect to said internal gear; winding drums for winding the leading and following membranes of the shutter respectively; spring loaded rewinding drums for rewinding the membranes upon release of the winding drums; gearings operatively connected to said winding drums respectively, said last mentioned gearings including projecting members; and pawls adapted to engage said projecting members to retain the respective winding drums in a wound up position, the pawl adapted to retain one of said winding drums being releasable by one of said cams and the pawl adapted to retain the other of said winding drums being releasable by the other of said cams.

5. Photographic exposure time limit adjusting means for a focal plane shutter comprising: a planetary gearing comprising a planetary pinion and an internal gear; a first cam rotatable about the axis of said gearing with said planetary pinion; a second cam rigidly fixed with respect to said internal gear; winding drums for winding the leading and following membranes of the shutter respectively; rewinding drums for rewinding the membranes upon release of the winding drums; gearings operatively connected to said winding drums respectively, said last mentioned gearings including projecting members; and pawls adapted to engage said projecting members to retain the respective winding drums in a wound up position, the pawl adapted to retain one of said winding drums being releasable by one of said cams by rotation of said planetary gearing as a whole and the pawl adapted to retain the other of said winding drums being releasable by the other of said cams by further rotation of said planeary gearing as a whole.

6. Photographic exposure time limit adjusting means for a focal plane shutter comprising a driving gear; a pawl operatively connected to the shutter release; a stop on said driving gear adapted to engage said pawl; an angularly adjustable sun gear; a planetary pinion meshing with said sun gear; and internal gear fixed to said driving gear and meshing with said planetary pinion; a first cam rotatable about said sun gear with said planetary pinion; a second cam rigidly fixed to said driving gear; winding drums for winding up the leading and following membranes of the shutter respectively; spring loaded rewinding drums for rewinding the membranes upon release of the winding drums; a spring loaded shaft geared to said driving gear; two further gears arranged coaxially with said driving gear and geared through intermediate gearing to the winding drums for the leading and following membranes of the shutter respectively, said further gears being adapted to receive torque from said driving gear in succession through pin to pin contact for driving said winding drums in a winding direction only; pawls operable by said first and second cams respectively; and projections on said further gears adapted to engage said pawls.

7. Photographic exposure time limit adjusting means for a focal plane shutter comprising: a driving gear; a pawl operatively connected to the shutter release; a stop on said driving gear adapted to engage said pawl; an angularly adjustable sun gear; a planetary pinion meshing with said sun gear; an internal gear fixed to said driving gear and meshing with said planetary pinion; a first cam rotatable about said sun gear with said planetary pinion; a second cam rigidly fixed to said driving gear; winding drums for winding up the leading and following membranes of the shutter respectively; rewinding drums for rewinding the membranes upon release of the winding drums; two further gears arranged coaxially with said driving gear and geared through intermediate gearing to the winding drums for the leading and following membranes of the shutter respectively, said further gears being adapted to receive torque from said driving gear in succession through pin to pin contact for driving said winding drums in a winding direction only; and pawls adapted to retain the respective winding drums in a wound up position, said pawls being releasable by said first and second cams respectively.

8. Photographic explosure time limit adjusting means for a focal plane shutter comprising: a driving gear; a pawl operatively connected to the shutter release; a stop on said driving gear adapted to engage said pawl; an angularly adjustable sun gear; a planetary pinion meshing with said sun gear; an internal gear fixed to said driving gear and meshing with said planetary pinion; a first cam rotatable about said sun gear with said planetary pinion; a second cam rigidly fixed to said driving gear; winding drums for winding up the leading and following membranes of the shutter respectively; spring loaded rewinding drums for rewinding the respective membranes upon release of the respective winding drums; a spring loaded shaft geared to said driving gear; two further gears arranged coaxially with said driving gear and geared through intermediate gearing to the winding drums for the leading and following membranes of the shutter respectively, said further gears being adapted to receive torque from said driving gear in succession through pin to pin contact for driving said winding drums in a winding direction only whereby the membranes may be wound upon by rotation of said spring loaded shaft; and pawls adapted to retain the winding drums in wound up position said pawls being releasable by said first and second cams respectively to thereby release the leading and following membranes at a time interval dependent upon the relative angular positions of said cams with respect to each other.

References Cited in the file of this patent

UNITED STATES PATENTS

| | | |
|---|---|---|
| 2,039,517 | Black | May 5, 1936 |
| 2,180,028 | Wittel | Nov. 14, 1939 |
| 2,472,607 | Mihalyi | June 7, 1949 |
| 2,673,501 | Duchatellier | Mar. 30, 1954 |

FOREIGN PATENTS

| | | |
|---|---|---|
| 634,304 | Germany | Aug. 25, 1936 |